(12) United States Patent
Awada et al.

(10) Patent No.: US 11,812,322 B2
(45) Date of Patent: Nov. 7, 2023

(54) CHANNEL STATE INFORMATION REFERENCE SIGNAL CONFIGURATION FOR INTER-CELL MOBILITY

(71) Applicant: Nokia Technologies Oy, Espoo (FI)

(72) Inventors: Ahmad Awada, Munich (DE); Timo Koskela, Oulu (FI); Jorma Kaikkonen, Oulu (FI); Jedrzej Stanczak, Wroclaw (PL); Ingo Viering, Munich (DE)

(73) Assignee: Nokia Technologies Oy, Espoo (FI)

( * ) Notice: Subject to any disclaimer, the term of this patent is extended or adjusted under 35 U.S.C. 154(b) by 170 days.

(21) Appl. No.: 17/053,478

(22) PCT Filed: May 15, 2019

(86) PCT No.: PCT/IB2019/054036
§ 371 (c)(1),
(2) Date: Nov. 6, 2020

(87) PCT Pub. No.: WO2019/220370
PCT Pub. Date: Nov. 21, 2019

(65) Prior Publication Data
US 2021/0160754 A1    May 27, 2021

Related U.S. Application Data

(60) Provisional application No. 62/672,921, filed on May 17, 2018.

(51) Int. Cl.
*H04W 36/32* (2009.01)
*H04W 16/28* (2009.01)
(Continued)

(52) U.S. Cl.
CPC ........... *H04W 36/32* (2013.01); *H04W 16/28* (2013.01); *H04W 36/0094* (2013.01);
(Continued)

(58) Field of Classification Search
CPC . H04W 24/10; H04W 16/28; H04W 36/0058; H04W 36/0094; H04W 36/32;
(Continued)

(56) References Cited

U.S. PATENT DOCUMENTS

2017/0150385 A1    5/2017 Henttonen et al.
2019/0081753 A1*   3/2019 Jung ...................... H04B 7/063
(Continued)

FOREIGN PATENT DOCUMENTS

WO    2018/084776 A1    5/2018

OTHER PUBLICATIONS

"3rd Generation Partnership Project; Technical Specification Group Radio Access Network; NR; Radio Resource Control (RRC) protocol specification (Release 15)", 3GPP TS 38.331, V15.1.0, Mar. 2018, pp. 1-268.
(Continued)

*Primary Examiner* — Margaret G Mastrodonato
(74) *Attorney, Agent, or Firm* — Nokia Technologies Oy

(57) ABSTRACT

Systems, methods, apparatuses, and computer program products for configuring Channel State Information-Reference Signal (CSI-RS) resources of neighboring cells for inter-cell mobility are provided. One method may include providing, by a network node, at least one reporting configuration to one or more user equipment. The reporting configuration is based on at least one of channel state information reference signals (CSI-RS) or synchronization signal/physical broadcast channel (SS/PBCH) blocks. The method may also include receiving at least one measurement report comprising measurement results when and as specified by the at least one reporting configuration.

12 Claims, 3 Drawing Sheets

(51) Int. Cl.
  *H04W 36/00* (2009.01)
  *H04W 36/08* (2009.01)
  *H04W 56/00* (2009.01)
  *H04W 72/30* (2023.01)

(52) U.S. Cl.
  CPC ......... *H04W 36/08* (2013.01); *H04W 56/001* (2013.01); *H04W 72/30* (2023.01)

(58) Field of Classification Search
  CPC .. H04W 36/08; H04W 56/001; H04W 72/005
  See application file for complete search history.

(56) References Cited

U.S. PATENT DOCUMENTS

| | | | | |
|---|---|---|---|---|
| 2019/0281485 | A1* | 9/2019 | da Silva | H04B 17/336 |
| 2020/0068462 | A1* | 2/2020 | Zetterberg | H04W 36/0058 |
| 2021/0022130 | A1* | 1/2021 | Gao | H04L 5/0051 |
| 2021/0112508 | A1* | 4/2021 | Xiang | H04L 5/0053 |
| 2021/0160905 | A1* | 5/2021 | Liou | H04L 5/0044 |
| 2021/0345191 | A1* | 11/2021 | Da Silva | H04W 74/04 |

OTHER PUBLICATIONS

"3rd Generation Partnership Project; Technical Specification Group Radio Access Network; NR; Physical channels and modulation (Release 15)", 3GPP TS 38.211, V15.1.0, Mar. 2018, pp. 1-90.

"3rd Generation Partnership Project; Technical Specification Group Radio Access Network; NR; Physical layer procedures for data (Release 15)", 3GPP TS 38.214, V15.1.0, Mar. 2018, pp. 1-77.

"3rd Generation Partnership Project; Technical Specification Group Radio Access Network; Evolved Universal Terrestrial Radio Access (E-UTRA); Radio Resource Control (RRC);Protocol specification (Release 15)", 3GPP TS 36.331, V15.1.0, Mar. 2018, pp. 1-786.

International Search Report and Written Opinion received for corresponding Patent Cooperation Treaty Application No. PCT/IB2019/054036, dated Dec. 12, 2019, 14 pages.

"Correction for L3 RRM Procedures", 3GPP TSG-RAN WG2 Meeting #102, R2-180xxxx, Huawei, May 21-26, 2018, 163 pages.

"On Cell Quality Derivation Procedural text in 38.304", 3GPP TSG-RAN WG2 #101, Tdoc R2-1804725, Agenda : 10.4.5.5, Ericsson, Apr. 16-20, 2018, pp. 1-7.

* cited by examiner

CHANNEL STATE INFORMATION REFERENCE SIGNAL CONFIGURATION FOR INTER-CELL MOBILITY

RELATED APPLICATION

This application claims priority to PCT Application No. PCT/IB2019/054036, filed on May 15, 2019, which claims priority to U.S. Provisional Application No. 62/672,921, filed on May 17, 2018, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology. For example, certain embodiments may relate to the configuration of Channel State Information-Reference Signal (CSI-RS) resources of neighboring cells for inter-cell mobility.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) or new radio (NR) wireless systems refer to the next generation (NG) of radio systems and network architecture. It is estimated that NR will provide bitrates on the order of 10-20 Gbit/s or higher, and will support at least enhanced mobile broadband (eMBB) and ultra-reliable low-latency-communication (URLLC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G or NR, the nodes that can provide radio access functionality to a user equipment (i.e., similar to Node B in E-UTRAN or eNB in LTE) may be referred to as a next generation or 5G Node B (gNB).

SUMMARY

One embodiment is directed to a method, which may include providing, by a network node, at least one reporting configuration to one or more user equipment. The reporting configuration may be based on at least one of channel state information reference signals (CSI-RS) and/or synchronization signal/physical broadcast channel (SS/PBCH) blocks. The method may also include receiving at least one measurement report comprising measurement results when and as specified by the at least one reporting configuration.

Another embodiment is directed to an apparatus that may include at least one processor and at least one memory comprising computer program code. The at least one memory and computer program code may be configured, with the at least one processor, to cause the apparatus at least to provide at least one reporting configuration to one or more user equipment. The reporting configuration may be based on at least one of channel state information reference signals (CSI-RS) or synchronization signal/physical broadcast channel (SS/PBCH) blocks. The at least one memory and computer program code may be further configured, with the at least one processor, to cause the apparatus at least to receive at least one measurement report comprising measurement results when and as specified by the at least one reporting configuration.

Another embodiment is directed to an apparatus that may include providing means for providing at least one reporting configuration to one or more user equipment. The reporting configuration may be based on at least one of channel state information reference signals (CSI-RS) and/or synchronization signal/physical broadcast channel (SS/PBCH) blocks. The apparatus may also include receiving means for receiving at least one measurement report comprising measurement results when and as specified by the at least one reporting configuration.

Another embodiment is directed to a method that may include receiving, at a user equipment, at least one reporting configuration from a network. The reporting configuration may be based on at least one of channel state information reference signals (CSI-RS) or synchronization signal/physical broadcast channel (SS/PBCH) blocks. The method may also include transmitting at least one measurement report comprising measurement results when and as specified by the at least one reporting configuration.

Another embodiment is directed to an apparatus that may include at least one processor and at least one memory comprising computer program code. The at least one memory and computer program code may be configured, with the at least one processor, to cause the apparatus at least to receive at least one reporting configuration from a network. The reporting configuration may be based on at least one of channel state information reference signals (CSI-RS) or synchronization signal/physical broadcast channel (SS/PBCH) blocks. The at least one memory and computer program code may be further configured, with the at least one processor, to cause the apparatus at least to transmit at least one measurement report comprising measurement results when and as specified by the at least one reporting configuration.

Another embodiment is directed to an apparatus that may include receiving means for receiving at least one reporting configuration from a network. The reporting configuration may be based on at least one of channel state information reference signals (CSI-RS) or synchronization signal/physical broadcast channel (SS/PBCH) blocks. The apparatus may also include transmitting means for transmitting at least one measurement report comprising measurement results when and as specified by the at least one reporting configuration.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for configuring Channel State Information-Reference Signal (CSI-RS) resources of neighboring cells for inter-cell mobility, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Certain example embodiments relate to the configuration of Channel State Information-Reference Signal (CSI-RS) resources of neighboring cells for inter-cell mobility. A network may configure a UE to perform and report measurements according to a measurement configuration provided by means of dedicated signaling, such as RRCReconfiguration message. See, e.g., Third Generation Partnership Project (3GPP) Technical Specification (TS) 38.331.

Figures 1, 2:
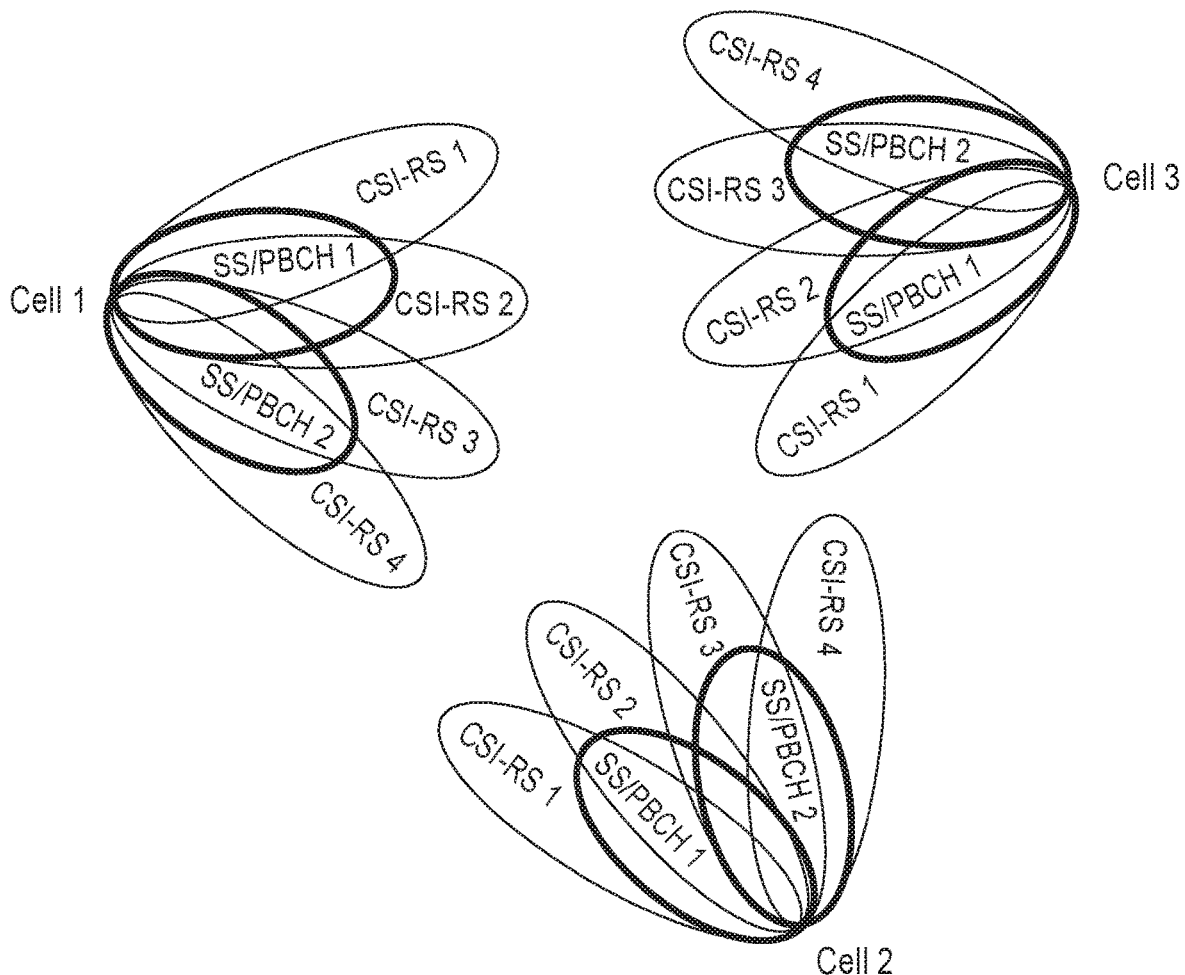
FIG. 1 illustrates an example diagram depicting cells each sweeping SS/PBCH blocks and CSI-RS resources.
FIG. 2 illustrates an example of the structure of a measurement configuration.

In one example, the network may configure the UE to report measurements based on Synchronization Signal/Physical Broadcast Channel (SS/PBCH) blocks or CSI-RS resources. One SS/PBCH block may include four orthogonal division multiplex (OFDM) symbols and may contain a Primary Synchronization Signal (PSS), a Secondary Synchronization Signal (SSS), and Physical Broadcast Channel (PBCH), along with Demodulation Reference Signal (DMRS). See, e.g., 3GPP TS 38.211. In an NR radio access multi-beam system, the SS/PBCH blocks are swept in time to ensure sufficient coverage for the broadcast and synchronization, i.e., each SS/PBCH block is sent in a specific direction at a time. Similarly, CSI-RS resources are also transmitted in different time instants. FIG. 1 illustrates an example showing three cells—cell 1, cell 2 and cell 3—where each cell sweeps two SS/PBCH blocks and four CSI-RS resources.

Usually, the beams carrying CSI-RS resources have a smaller beam-width and higher beamforming gain than those carrying SS/PBCH blocks, which allows for spatially more refined beam measurements. It is noted that the SS/PBCH blocks are always transmitted, whereas the transmission of CSI-RS is configurable by the network.

The network can also indicate, to a UE, which SS/PBCH block is associated with each configured CSI-RS resource (overlapping SS/PBCH). See, e.g., 3GPP TS 38.331. For instance, CSI-RS 1 and CSI-RS 2 can be associated with SS/PBCH 1, whereas CSI-RS 3 and CSI-RS 4 can be associated with SS/PBCH 2. Moreover, a UE is not required to monitor the CSI-RS resources with associated SS/PBCH blocks if the corresponding SS/PBCH are not detected. If no associated SS/PBCH block is configured, a UE is required to always monitor the CSI-RS resources. See, e.g., 3GPP TS 38.214.

The network may configure the UE to report, for example, the following measurement information based on SS/PBCH blocks: measurement results per SS/PBCH block, measurement results per cell based on SS/PBCH block, i.e., average of L strongest SS/PBCH block measurements above a threshold T1, and/or SS/PBCH indices.

Similarly, the network may configure, for example, the UE to report the following measurement information based on CSI-RS resources: measurement results per CSI-RS resource, measurement results per cell based on CSI-RS resources, i.e., average of M strongest CSI-RS measurements above a threshold T2, and/or CSI-RS resource measurement identifiers.

FIG. 2 illustrates an example of the structure of the measurement configuration. As illustrated in the example of FIG. 2, the measurement configuration may specify the measurement objects, report configurations, and measurement IDs.

The measurement object defines the object that the UE must measure, such as carrier frequency. Moreover, the measurement object may include a list of cells (white and black lists) that the UE should consider in measurement reporting, a list of cell-specific offsets, configuration for cell measurement derivation, e.g., aforementioned parameters L, M T1 and T2, L3 filter coefficients, and a list of CSI-RS resources to measure.

The report configuration defines the reporting procedure and the format of the measurement report that the UE sends to the network. Each reporting configuration may include a reporting criterion, reference signal type, and/or reporting format. The reporting criterion refers to the criterion that triggers the UE to send measurement: 1) Periodic reporting or 2) Event-triggered reporting, e.g., using measurement event A3 or A4. The reference signal type refers to the reference signal that the UE shall use for beam and cell measurement results, e.g., SS/PBCH or CSI-RS. The reporting format refers to the measurement quantities per cell or/and per beam, e.g., RSRP or RSRQ, that the UE may include in the measurement report along with the maximum number of cells and maximum number of beams per cell to report.

The measurement ID associates a measurement object with a reporting configuration. By configuring multiple measurement IDs, more than one reporting configuration can be linked to the same measurement object. For example, the network can configure the UE to perform and report intra-frequency measurements, e.g., Meas. Object 1 in FIG. 2, following two reporting configurations: Report Configuration 1, 2 using SS/PBCH and CSI-RS as reference signal type, respectively.

In current 3GPP specifications, the maximum number of CSI-RS resources for L3 mobility per frequency layer (for serving and neighboring cells of same frequency) is limited to 64 when no associated SS/PBCH block is provided for one or more CSI-RS resources and limited to 96 when associated SS/PBCH block is provided. See, e.g., 3GPP TS 38.331.

Considering that a serving cell can have a high number of neighbors (e.g., >10) and the number of CSI-RS per cell can be up to 96, the network may not be able to configure the UE with all CSI-RS resources of serving and neighboring cells for inter-cell mobility. As a result, the network can only configure the UE to monitor and measure a subset of CSI-RS resources for a limited number of neighboring cells. This implies that the list of CSI-RS resources may need to be reconfigured for a moving UE such that it always contains the relevant CSI-RS for inter-cell mobility.

Under previous solutions, many of the measurement reports transmitted by the UEs could be in vain since the reported SS/PBCH blocks could be already associated with configured CSI-RS resources. In this case, the network needs not to take any further action. This may lead to an unnecessary increase in uplink signalling, and an increase in UE processing and power consumption. As such, certain example embodiments provide tailored reporting mechanisms that can overcome at least these drawbacks. In other words, certain embodiments may, for example, reduce uplink signaling, reduce UE processing requirements, and reduce UE power consumption.

Some example embodiments include that a UE, which is configured with CSI-RS resources for L3 mobility that have associated SS/PBCH blocks, may send measurement reports that are based on SS/PBCH block measurements (periodic reporting or event-triggered) only if the measurement report contains a measurement result for a relevant and/or strong SS/PBCH block (from serving cell, configured neighbour cell or a new neighbour cell) that is either (1) not associated with a configured CSI-RS resource or (2) associated with CSI-RS resources that are not sufficiently detected. According to an embodiment, a CSI-RS resource is not sufficiently detected if its corresponding reference signal is not received sufficiently/strongly to confirm the detection of the signal unambiguously, or the reference signal is not received with sufficiently high level or quality.

In an example embodiment, the UE may be configured with two reporting configurations that are based on different reference signal types. For instance, the first reporting configuration may be based on CSI-RS, whereas the second reporting configuration may be based on SS/PBCH block. According to an embodiment, the UE may send the measurement reports that are triggered by the first reporting configuration. However, in an embodiment, the measurement report that is triggered by the second reporting configuration is sent when the measurement results contain a measurement for a relevant SS/PBCH block that is either not associated with a configured CSI-RS or associated with CSI-RS resources that are not sufficiently detected.

According to an example, the reporting configuration using SS/PBCH as reference signal contains a flag instructing the UE to send the measurement report only if the measurement results contain a measurement for a relevant SS/PBCH block that is either not associated with a configured CSI-RS or associated with CSI-RS resources that are not sufficiently detected. Otherwise, the UE refrains from sending the measurement report.

In another example embodiment, the UE may be configured with just one reporting configuration, instead of two (or more). As a result, this embodiment may have a more compact signalling format. According to an embodiment, with the one reporting configuration, the UE may send the measurement reports that are based on CSI-RS, but the measurement reports that are based on SS/PBCH blocks are sent if the measurement results contain a measurement for a relevant SS/PBCH block that is either not associated with a configured CSI-RS or associated with CSI resources that are not sufficiently detected. In certain embodiments, the UE may carry out cell and beam measurements based on CSI-RS and SS/PBCH block and the same reporting criterion (periodic or event-triggered) and format (RSRP or RSRQ) may apply for both reference signal types.

In an example, the reporting configuration may contain a flag instructing the UE to carry out cell and beam measurements using CSI-RS and SS/PBCH and to follow the same reporting criterion, such as periodic reporting or event-triggered, and reporting format, such as RSRP or RSRQ, for both reference signal types.

According to an example embodiment, the measurement reports that are based on SS/PBCH blocks may contain, in addition to SS/PBCH measurements, the CSI-RS based measurements if available.

According to an example embodiment, a SS/PBCH block measurement may be deemed to be relevant if it exceeds a certain threshold that is provided in a reporting configuration. In another example embodiment, a SS/PBCH block measurement may be deemed to be relevant if it is offset lower or higher than a reference SS/PBCH block measurement, where the offset may be provided in the reporting configuration.

In an example embodiment, the reference SS/PBCH block measurement may correspond to the strongest SS/PBCH block measurement in a cell. According to certain embodiments, a CSI-RS resource is sufficiently detected if its measurement is above a certain threshold provided in a reporting configuration.

According to certain embodiments, the measurement report that is based on SS/PBCH block may be sent periodically. In some embodiments, the measurement report that is based on SS/PBCH block may be triggered by a measurement event, which may be evaluated using SS/PBCH block measurements. According to certain embodiments, the measurement report that is based on SS/PBCH block may be triggered by a measurement event that is evaluated using the cell measurements derived based on SS/PBCH block measurements. In some example embodiments, the measurement report that is based on SS/PBCH block measurements may contain the N strongest SS/PBCH blocks above a predefined threshold.

According to certain embodiments, for example in case of a measurement event that is evaluated using the cell measurement derived based on SS/PBCH blocks, the UE may send a new measurement report (after having the first measurement report sent) while the reporting condition of the measurement event still holds but the measurement results contain at least one relevant and/or strong SS/PBCH block (either not associated with a configured CSI-RS resource or associated with CSI-RS resources that are not sufficiently detected) that was not previously reported to the network, for example, in the previous Y measurement reports or it has been X ms since the last measurement report is sent. This approach may ensure that the UE keeps reporting new relevant/strong SS/PBCH blocks after the reporting condition of the measurement event, evaluated using the derived cell measurement, has been fulfilled for the first time.

According to an example embodiment, the measurement report may contain at least one relevant and/or strong SS/PBCH block that was not previously reported. In some embodiments, the measurement report may include the SS/PBCH blocks that were used to derive the cell measurement. According to certain embodiments, the measurement report may include the SS/PBCH blocks that were used to derive cell measurement, excluding SS/PBCH blocks that are associated with CSI-RS that are sufficiently detected.

Figure 3A:
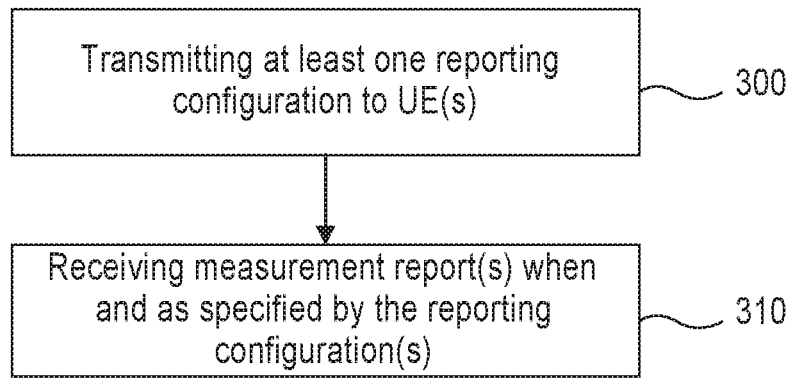
FIG. 3a illustrates an example flow diagram of a method, according to an embodiment.

FIG. 3a illustrates an example flow diagram of a method for measurement configuration, according to an embodiment. In certain embodiments, the method of FIG. 3a may be performed by a network node, such as a base station, gNB, or the like, for example. As illustrated in the example of FIG. 3a, the method may include, at 300, providing or transmitting at least one reporting configuration to UE(s). According to certain embodiments, the method may then include, at 310, receiving measurement report(s) when and as specified by the reporting configuration(s).

In an embodiment, the transmitting 300 may include providing the UE(s) with two reporting configurations that are based on different reference signal types. In this embodiment, one of the two reporting configurations may be based on CSI-RS and the second of the two reporting configurations may be based on SS/PBCH block.

According to another embodiment, the transmitting 300 may include providing the UE with a single reporting configuration for both CSI-RS and SS/PBCH. In this embodiment, the UE may carry out cell and beam measurements based on CSI-RS and SS/PBCH block and the same reporting criterion (e.g., periodic or event-triggered) and format (e.g., RSRP or RSRQ) may apply for both reference signal types.

In certain embodiments, the transmitting 300 may include providing the UE(s) with reporting configuration(s) that contains a flag instructing the UE(s) when or if to send a measurement report. For example, in one embodiment, the reporting configuration(s) may contain a flag instructing the UE to send the measurement report only if the measurement results contain a measurement for a relevant SS/PBCH block that is either not associated with a configured CSI-RS or associated with CSI-RS resources that are not sufficiently detected. Otherwise, the UE refrains from sending the measurement report. In another embodiment, the reporting configuration(s) may contain a flag instructing the UE to carry out cell and beam measurements using CSI-RS and SS/PBCH and to follow the same reporting criterion and reporting format for both reference signal types.

According to an embodiment, the receiving 310 may include receiving, from the UE(s), measurement reports that are triggered by the first reporting configuration or based on CSI-RS, and receiving measurement reports triggered by the second reporting configuration or based on SS/PBCH when the measurement results contain a measurement for relevant SS/PBCH block that is either not associated with a configured CSI-RS or associated with CSI-RS resources that are not sufficiently detected.

In an embodiment, the receiving 310 may include receiving measurement report(s) based on SS/PBCH blocks that may contain, in addition to SS/PBCH measurements, the CSI-RS based measurements if available.

According to an example embodiment, a SS/PBCH block measurement may be deemed to be relevant if it exceeds a certain threshold that is provided in a reporting configuration. In another example embodiment, a SS/PBCH block measurement may be deemed to be relevant if it is offset lower or higher than a reference SS/PBCH block measurement, where the offset may be provided in the reporting configuration.

In one example embodiment, the reference SS/PBCH block measurement may correspond to the strongest SS/PBCH block measurement in a cell. According to certain embodiments, a CSI-RS resource is sufficiently detected if its measurement is above a certain threshold provided in a reporting configuration.

According to certain embodiments, the receiving 310 may include periodically receiving the measurement report that is based on SS/PBCH block. In some embodiments, the measurement report that is based on SS/PBCH block may be triggered by a measurement event, which may be evaluated using SS/PBCH block measurements.

According to certain embodiments, the measurement report that is based on SS/PBCH block may be triggered by a measurement event that is evaluated using the cell measurements derived based on SS/PBCH block measurements. In some example embodiments, the measurement report that is based on SS/PBCH block measurements may contain the N strongest SS/PBCH blocks above a predefined threshold.

According to certain embodiments, for example in case of a measurement event that is evaluated using the cell measurement derived based on SS/PBCH blocks, the method may include receiving, from the UE(s), a new measurement report (after having the first measurement report sent) while the reporting condition of the measurement event still holds but the measurement results contain at least one relevant and/or strong SS/PBCH block (either not associated with a configured CSI-RS resource or associated with CSI-RS resources that are not sufficiently detected) that was not previously reported to the network, for example, in the previous Y measurement reports or in X ms since the last measurement report.

According to an example embodiment, the receiving 310 may include receiving a measurement report that may contain at least one relevant and/or strong SS/PBCH block that was not previously reported. In some embodiments, the receiving 310 may include receiving a measurement report that may include the SS/PBCH blocks that were used to derive the cell measurement. According to certain embodiments, the receiving 310 may include receiving a measurement report that may include the SS/PBCH blocks that were used to derive cell measurement, excluding SS/PBCH blocks that are associated with CSI-RS that are sufficiently detected.

Figure 3B:
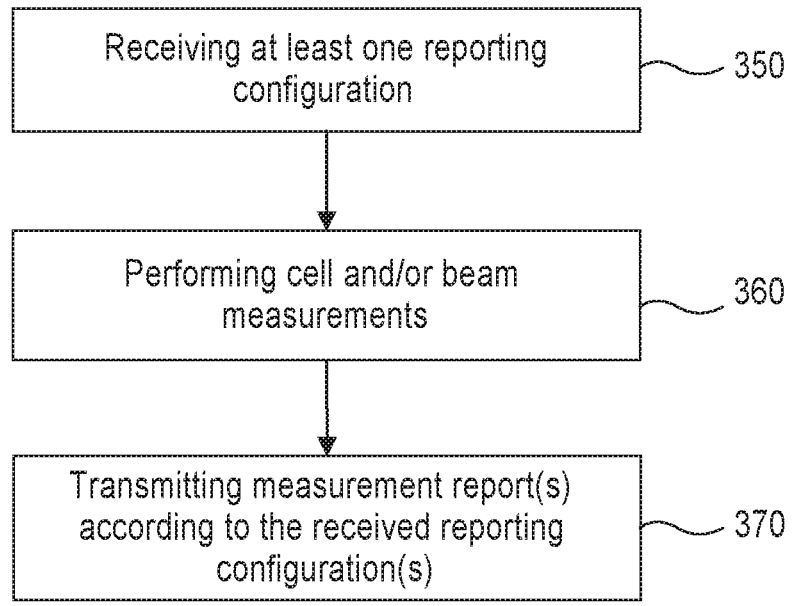
FIG. 3b illustrates an example flow diagram of a method, according to another embodiment.

FIG. 3b illustrates an example flow diagram of a method for measurement configuration, according to an embodiment. In certain embodiments, the method of FIG. 3b may be performed by a UE, mobile station, mobile equipment, IoT device, or the like, for example. As illustrated in the example of FIG. 3b, the method may include, at 350, receiving at least one reporting configuration from a network node. In an embodiment, the method may also include, at 360, performing cell and/or beam measurements based on the reporting configuration(s). According to certain embodiments, the method may then include, at 370, transmitting measurement report(s) when and as specified by the reporting configuration(s).

In an embodiment, the receiving 350 may include receiving two reporting configurations that are based on different reference signal types. In this embodiment, one of the two reporting configurations may be based on CSI-RS and the second of the two reporting configurations may be based on SS/PBCH block. According to another embodiment, the receiving 350 may include receiving a single reporting configuration for both CSI-RS and SS/PBCH.

In an example embodiment, the performing 360 may include carrying out cell and beam measurements based on CSI-RS and SS/PBCH block and the same reporting criterion (e.g., periodic or event-triggered) and format (e.g., RSRP or RSRQ) may apply for both reference signal types.

In certain embodiments, the receiving 350 may include receiving reporting configuration(s) that contains a flag instructing the UE(s) when or if to send a measurement report. For example, in one embodiment, the reporting configuration(s) may contain a flag instructing the UE to send the measurement report only if the measurement results contain a measurement for a relevant SS/PBCH block that is either not associated with a configured CSI-RS or associated with CSI-RS resources that are not sufficiently detected. Otherwise, the UE refrains from sending the measurement report. In another embodiment, the reporting configuration(s) may contain a flag instructing the UE to carry out cell and beam measurements using CSI-RS and SS/PBCH and to follow the same reporting criterion and reporting format for both reference signal types.

According to one embodiment, the transmitting 370 may include transmitting measurement reports that are triggered by the first reporting configuration or based on CSI-RS, and transmitting measurement reports triggered by the second reporting configuration or based on SS/PBCH when the measurement results contain a measurement for relevant SS/PBCH block that is either not associated with a configured CSI-RS or associated with CSI-RS resources that are not sufficiently detected.

In an embodiment, the transmitting 370 may include transmitting measurement report(s) based on SS/PBCH blocks that may contain, in addition to SS/PBCH measurements, the CSI-RS based measurements if available.

According to certain embodiments, the transmitting 370 may include periodically transmitting the measurement report that is based on SS/PBCH block. In some embodiments, the measurement report that is based on SS/PBCH block may be triggered by a measurement event, which may be evaluated using SS/PBCH block measurements. According to certain embodiments, the measurement report that is based on SS/PBCH block may be triggered by a measurement event that is evaluated using the cell measurements derived based on SS/PBCH block measurements. In some example embodiments, the measurement report that is based on SS/PBCH block measurements may contain the N strongest SS/PBCH blocks above a predefined threshold.

According to certain embodiments, for example in case of a measurement event that is evaluated using the cell measurement derived based on SS/PBCH blocks, the method may include transmitting a new measurement report (after having the first measurement report sent) while the reporting condition of the measurement event still holds but the measurement results contain at least one relevant and/or strong SS/PBCH block (either not associated with a configured CSI-RS resource or associated with CSI-RS resources that are not sufficiently detected) that was not previously reported to the network, for example, in the previous Y measurement reports or in X ms since the last measurement report.

According to an example embodiment, the transmitting 370 may include transmitting a measurement report that may contain at least one relevant and/or strong SS/PBCH block that was not previously reported. In some embodiments, the transmitting 370 may include transmitting a measurement report that may include the SS/PBCH blocks that were used to derive the cell measurement. According to certain embodiments, the transmitting 370 may include transmitting a measurement report that may include the SS/PBCH blocks that were used to derive cell measurement, but excluding SS/PBCH blocks that are associated with CSI-RS that are sufficiently detected.

Figure 4A:
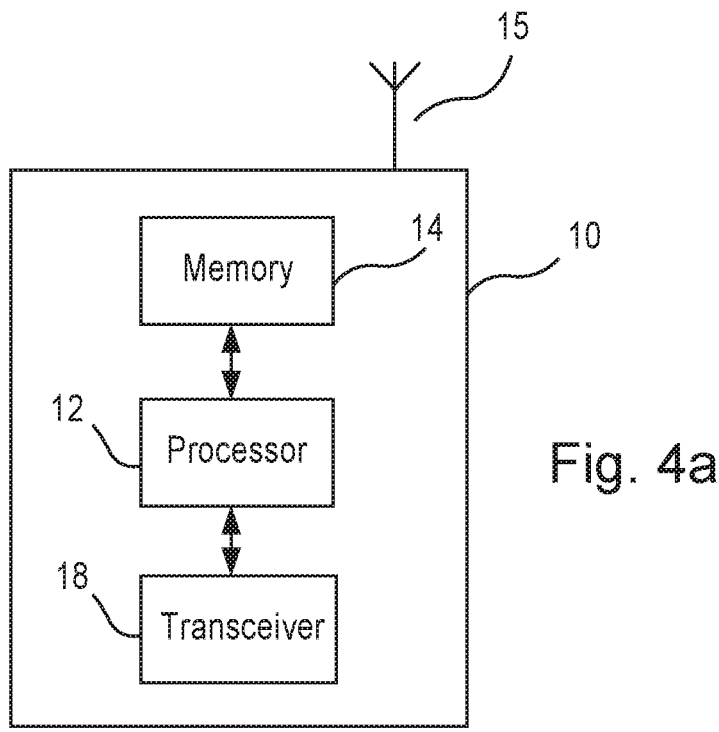
FIG. 4a illustrates an example block diagram of an apparatus, according to one embodiment.

FIG. 4a illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), and/or subscription server associated with a radio access network, such as a GSM network, LTE network, 5G or NR.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 4a.

As illustrated in the example of FIG. 4a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as the flow diagrams illustrated in FIG. 3a. In certain embodiments, apparatus 10 may be configured to perform a procedure for the configuration of reference signals for inter-cell mobility.

In one embodiment, apparatus 10 may be controlled by memory 14 and processor 12 to provide or transmit at least one reporting configuration to one or more UE(s). According to certain embodiments, apparatus 10 may also be controlled by memory 14 and processor 12 to receive measurement report(s) when and as specified by the reporting configuration(s).

In one embodiment, apparatus 10 may be controlled by memory 14 and processor 12 to provide the UE(s) with two reporting configurations that are based on different reference signal types. In this embodiment, one of the two reporting configurations may be based on CSI-RS and the second of the two reporting configurations may be based on SS/PBCH block.

According to another embodiment, apparatus 10 may be controlled by memory 14 and processor 12 to provide the UE with a single reporting configuration for both CSI-RS and SS/PBCH. In this embodiment, the UE may carry out cell and beam measurements based on CSI-RS and SS/PBCH block and the same reporting criterion (e.g, periodic or event-triggered) and format (e.g., RSRP or RSRQ) may apply for both reference signal types.

In certain embodiments, apparatus 10 may be controlled by memory 14 and processor 12 to provide the UE(s) with reporting configuration(s) that contains a flag instructing the UE(s) when or if to send a measurement report. For example, in one embodiment, the reporting configuration(s) may contain a flag instructing the UE to send the measurement report only if the measurement results contain a measurement for a relevant SS/PBCH block that is either not associated with a configured CSI-RS or associated with CSI-RS resources that are not sufficiently detected. Otherwise, the UE refrains from sending the measurement report. In another embodiment, the reporting configuration(s) may contain a flag instructing the UE to carry out cell and beam measurements using CSI-RS and SS/PBCH and to follow the same reporting criterion and reporting format for both reference signal types.

According to one embodiment, apparatus 10 may be controlled by memory 14 and processor 12 to receive, from the UE(s), measurement reports that are triggered by the first reporting configuration or based on CSI-RS, and to receive measurement reports triggered by the second reporting configuration or based on SS/PBCH when the measurement results contain a measurement for relevant SS/PBCH block that is either not associated with a configured CSI-RS or associated with CSI-RS resources that are not sufficiently detected.

In an embodiment, apparatus 10 may be controlled by memory 14 and processor 12 to receive measurement report(s) based on SS/PBCH blocks that may contain, in addition to SS/PBCH measurements, the CSI-RS based measurements if available.

According to an example embodiment, a SS/PBCH block measurement may be deemed to be relevant if it exceeds a certain threshold that is provided in a reporting configuration. In another example embodiment, a SS/PBCH block measurement may be deemed to be relevant if it is offset lower or higher than a reference SS/PBCH block measurement, where the offset may be provided in the reporting configuration.

In one example embodiment, the reference SS/PBCH block measurement may correspond to the strongest SS/PBCH block measurement in a cell. According to certain embodiments, a CSI-RS resource is sufficiently detected if its measurement is above a certain threshold provided in a reporting configuration.

According to certain embodiments, apparatus 10 may be controlled by memory 14 and processor 12 to periodically receive the measurement report that is based on SS/PBCH block. In some embodiments, the measurement report that is based on SS/PBCH block may be triggered by a measurement event, which may be evaluated using SS/PBCH block measurements. According to certain embodiments, the measurement report that is based on SS/PBCH block may be triggered by a measurement event that is evaluated using the cell measurements derived based on SS/PBCH block measurements. In some example embodiments, the measurement report that is based on SS/PBCH block measurements may contain the N strongest SS/PBCH blocks above a predefined threshold.

According to certain embodiments, for example in case of a measurement event that is evaluated using the cell measurement derived based on SS/PBCH blocks, apparatus 10 may be controlled by memory 14 and processor 12 to receive, from the UE(s), a new measurement report (after having the first measurement report sent) while the reporting condition of the measurement event still holds but the measurement results contain at least one relevant and/or strong SS/PBCH block (either not associated with a configured CSI-RS resource or associated with CSI-RS resources that are not sufficiently detected) that was not previously reported to the network, for example, in the previous Y measurement reports or in X ms since the last measurement report.

According to an example embodiment, apparatus 10 may be controlled by memory 14 and processor 12 to receive a measurement report that may contain at least one relevant and/or strong SS/PBCH block that was not previously reported. In some embodiments, apparatus 10 may be controlled by memory 14 and processor 12 to receive a measurement report that may include the SS/PBCH blocks that were used to derive the cell measurement. According to certain embodiments, apparatus 10 may be controlled by memory 14 and processor 12 to receive a measurement report that may include the SS/PBCH blocks that were used to derive cell measurement, excluding SS/PBCH blocks that are associated with CSI-RS that are sufficiently detected.

Figure 4B:
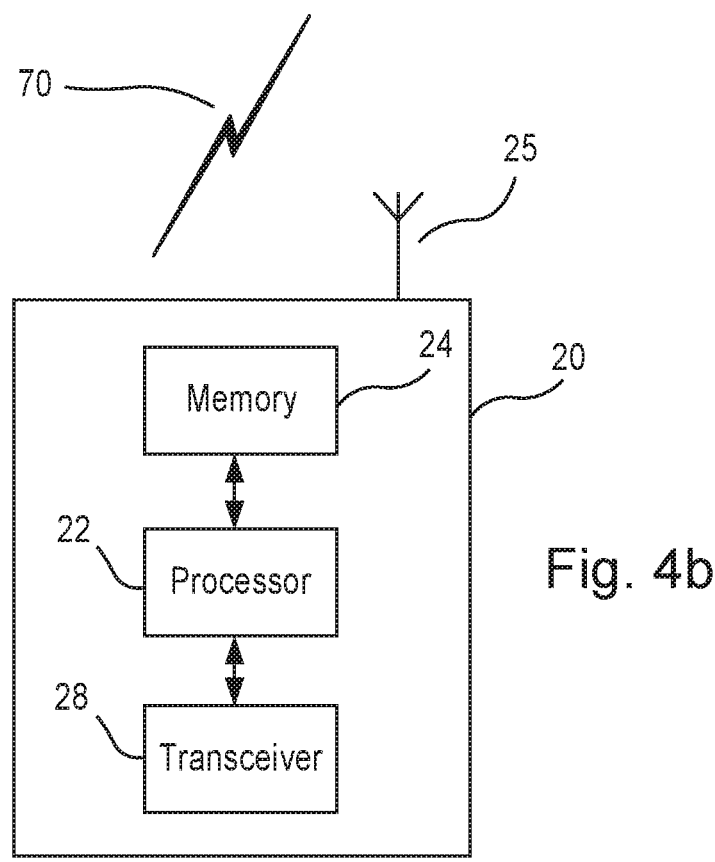
FIG. 4b illustrates an example block diagram of an apparatus, according to another embodiment.

FIG. 4b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 4b.

As illustrated in the example of FIG. 4b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 10 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10, which may represent one or more access nodes or base stations, such as an eNB or gNB, via a wireless or wired communications link 70 according to any radio access technology, such as 5G or NR.

According to some embodiments, processor 22 and memory 24 may be included in or may form a part of processing circuitry or control circuitry. In addition, in some embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as the flow diagrams illustrated in FIG. 3b.

According to some embodiments, apparatus 20 may be controlled by memory 24 and processor 22 to receive at least one reporting configuration from a network node. In an embodiment, apparatus 20 may also be controlled by memory 24 and processor 22 to perform cell and/or beam measurements based on the reporting configuration(s). According to certain embodiments, apparatus 20 may then be controlled by memory 24 and processor 22 to transmit measurement report(s) when and as specified by the received reporting configuration(s).

In one embodiment, apparatus 20 may be controlled by memory 24 and processor 22 to receive two reporting configurations that are based on different reference signal types. In this embodiment, one of the two reporting configurations may be based on CSI-RS and the second of the two reporting configurations may be based on SS/PBCH block. According to another embodiment, apparatus 20 may be controlled by memory 24 and processor 22 to receive a single reporting configuration for both CSI-RS and SS/PBCH.

In an example embodiment, apparatus 20 may be controlled by memory 24 and processor 22 to carry out cell and beam measurements based on CSI-RS and SS/PBCH block and the same reporting criterion (e.g., periodic or event-triggered) and format (e.g., RSRP or RSRQ) may apply for both reference signal types.

In certain embodiments, apparatus 20 may be controlled by memory 24 and processor 22 to receive reporting configuration(s) that contains a flag instructing the UE(s) when or if to send a measurement report. For example, in one embodiment, the reporting configuration(s) may contain a flag instructing apparatus 20 to send the measurement report only if the measurement results contain a measurement for a relevant SS/PBCH block that is either not associated with a configured CSI-RS or associated with CSI-RS resources that are not sufficiently detected. Otherwise, apparatus 20 refrains from sending the measurement report. In another embodiment, the reporting configuration(s) may contain a flag instructing apparatus 20 to carry out cell and beam measurements using CSI-RS and SS/PBCH and to follow the same reporting criterion and reporting format for both reference signal types.

According to one embodiment, apparatus 20 may be controlled by memory 24 and processor 22 to transmit measurement reports that are triggered by the first reporting configuration or based on CSI-RS, and transmitting measurement reports triggered by the second reporting configuration or based on SS/PBCH when the measurement results contain a measurement for relevant SS/PBCH block that is either not associated with a configured CSI-RS or associated with CSI-RS resources that are not sufficiently detected.

In an embodiment, apparatus 20 may be controlled by memory 24 and processor 22 to transmit measurement report(s) based on SS/PBCH blocks that may contain, in addition to SS/PBCH measurements, the CSI-RS based measurements if available.

According to certain embodiments, apparatus 20 may be controlled by memory 24 and processor 22 to periodically transmit the measurement report that is based on SS/PBCH block. In some embodiments, the measurement report that is based on SS/PBCH block may be triggered by a measurement event, which may be evaluated using SS/PBCH block measurements. According to certain embodiments, the measurement report that is based on SS/PBCH block may be triggered by a measurement event that is evaluated using the cell measurements derived based on SS/PBCH block measurements. In some example embodiments, the measurement report that is based on SS/PBCH block measurements may contain the N strongest SS/PBCH blocks above a predefined threshold.

According to certain embodiments, for example in case of a measurement event that is evaluated using the cell measurement derived based on SS/PBCH blocks, apparatus 20 may be controlled by memory 24 and processor 22 to transmit a new measurement report (after having the first measurement report sent) while the reporting condition of the measurement event still holds but the measurement results contain at least one relevant and/or strong SS/PBCH block (either not associated with a configured CSI-RS resource or associated with CSI-RS resources that are not sufficiently detected) that was not previously reported to the network, for example, in the previous Y measurement reports or in X ms since the last measurement report.

According to an example embodiment, apparatus 20 may be controlled by memory 24 and processor 22 to transmit a measurement report that may contain at least one relevant and/or strong SS/PBCH block that was not previously reported. In some embodiments, apparatus 20 may be controlled by memory 24 and processor 22 to transmit a measurement report that may include the SS/PBCH blocks that were used to derive the cell measurement. According to certain embodiments, apparatus 20 may be controlled by memory 24 and processor 22 to transmit a measurement report that may include the SS/PBCH blocks that were used to derive cell measurement, but excluding SS/PBCH blocks that are associated with CSI-RS that are sufficiently detected.

Therefore, certain example embodiments provide several technical improvements, enhancements, and/or advantages. Various example embodiments can, for example, allow a UE to send a measurement report that is based on the SS/PBCH blocks when the measurement results contain a measurement for relevant SS/PBCH block that is not associated with a configured CSI-RS resource or if the associated CSI-RS resources are not detected/above a pre-defined threshold. As such, the UE would report only when it is necessary. As a result, certain embodiments can achieve reduced uplink signaling, reduced UE processing requirements, and reduced UE power consumption. Consequently, certain example embodiments can reduce overhead and improve the reliability and speed of networks. Thus, example embodiments can improve performance, latency, and/or throughput of networks and network nodes including, for example, access points, base stations/eNBs/gNBs, and mobile devices or UEs. Accordingly, the use of certain example embodiments results in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One embodiment may be directed to a method that may include providing, by a network node, two reporting configurations where one of the two reporting configurations is based on CSI-RS and the other of the two reporting configurations is based on SS/PBCH, or providing, by the network node, a single reporting configuration for both CSI-RS and SS/PBCH. The method may then include receiving a measurement report comprising measurement results as specified by the reporting configuration(s). In an example embodiment, the receiving of the measurement report may include receiving measurement reports that are based on SS/PBCH block measurements only if the measurement report contains a measurement result for a relevant/strong SS/PBCH block that is either not associated with a configured CSI-RS resource or associated with CSI-RS resources that are not sufficiently detected.

Another embodiment may be directed to an apparatus that may include at least one processor and at least one memory comprising computer program code. The at least one memory and computer program code may be configured, with the at least one processor, to cause the apparatus at least to provide two reporting configurations where one of the two reporting configurations is based on CSI-RS and the other of the two reporting configurations is based on SS/PBCH, or to provide a single reporting configuration for both CSI-RS and SS/PBCH. The at least one memory and computer program code may be further configured, with the at least one processor, to cause the apparatus at least to receive a measurement report comprising measurement results as specified by the reporting configuration(s).

Another embodiment is directed to an apparatus that may include providing means for providing two reporting configurations where one of the two reporting configurations is based on CSI-RS and the other of the two reporting configurations is based on SS/PBCH, or for providing a single reporting configuration for both CSI-RS and SS/PBCH. The apparatus may also include receiving means for receiving a measurement report comprising measurement results as specified by the reporting configuration(s).

Another embodiment is directed to a method that may include receiving, by a user equipment, two reporting configurations where one of the two reporting configurations is based on CSI-RS and the other of the two reporting configurations is based on SS/PBCH, or receiving, by the user equipment, a single reporting configuration for both CSI-RS and SS/PBCH. The method may then include transmitting a measurement report comprising measurement results as specified by the reporting configuration(s). In an example embodiment, the transmitting of the measurement report may include transmitting measurement reports that are based on SS/PBCH block measurements only if the measurement report contains a measurement result for a relevant/strong SS/PBCH block that is either not associated with a configured CSI-RS resource or associated with CSI-RS resources that are not sufficiently detected.

Another embodiment may be directed to an apparatus that may include at least one processor and at least one memory comprising computer program code. The at least one memory and computer program code may be configured, with the at least one processor, to cause the apparatus at least to receive two reporting configurations where one of the two reporting configurations is based on CSI-RS and the other of the two reporting configurations is based on SS/PBCH, or to receive a single reporting configuration for both CSI-RS and SS/PBCH. The at least one memory and computer program code may also be configured, with the at least one processor, to cause the apparatus at least to transmit a measurement report comprising measurement results as specified by the reporting configuration(s).

Another embodiment is directed to an apparatus that may include receiving means for receiving two reporting configurations where one of the two reporting configurations is based on CSI-RS and the other of the two reporting configurations is based on SS/PBCH, or for receiving a single reporting configuration for both CSI-RS and SS/PBCH. The apparatus may also include transmitting means for transmitting a measurement report comprising measurement results as specified by the reporting configuration(s).

One having ordinary skill in the art will readily understand that the example embodiments as discussed above may be practiced with steps in a different order, and/or with hardware elements in configurations which are different than those which are disclosed. Therefore, although some embodiments have been described based upon example preferred embodiments, it would be apparent to those of skill in the art that certain modifications, variations, and alternative constructions would be apparent, while remaining within the spirit and scope of example embodiments.

We claim:

1. An apparatus, comprising:
   at least one processor; and
   at least one memory comprising computer program code,
   the at least one memory and computer program code configured, with the at least one processor, to cause the apparatus at least to
   receive at least one reporting configuration from a network, wherein the reporting configuration is based on at least one of channel state information reference signals, CSI-RS, resource, or synchronization signal/physical broadcast channel, SS/PBCH, blocks, and wherein the reporting configuration includes information about an association between the at least one CSI-RS resource and the at least one SS/PBCH block;
   determine whether an SS/PBCH block is associated with at least one configured CSI-RS resource;
   in response to the determination that the SS/PBCH block is associated with at least one configured CSI-RS resource, determine whether the associated CSI-RS resource is sufficiently detected; and
   in response to the determination that the SS/PBCH block is not associated with at least one configured CSI-RS resource, or the determination that the associated CSI-RS resource is not sufficiently detected, transmit at least one measurement report that is based on the SS/PBCH block measurement when and as specified by the at least one reporting configuration, wherein a CSI-RS resource is sufficiently detected if its measurement is above a certain threshold provided in the at least one reporting configuration.

2. The apparatus according to claim 1, wherein when receiving, the at least one memory and computer program code configured, with the at least one processor, to cause the apparatus at least to receive a single reporting configuration for both the CSI-RS resource and the SS/PBCH blocks.

3. The apparatus according to claim 1, wherein when transmitting, the at least one memory and computer program code configured, with the at least one processor, to cause the apparatus at least to transmit the at least one measurement report while a reporting condition of a measurement event still holds, and wherein the at least one measurement report comprises at least one relevant SS/PBCH block that was not reported to the network node in previous Y measurement reports or X milliseconds since the last measurement report was sent.

4. The apparatus according to claim 1, wherein the at least one reporting configuration contains a flag instructing the user equipment to carry out cell and beam measurements using CSI-RS and SS/PBCH and to follow a same reporting criterion and reporting format for both reference signal types.

5. The apparatus according to claim 1, wherein the at least one measurement report that is based on SS/PBCH block measurements contains N strongest SS/PBCH blocks above a predefined threshold.

6. The apparatus according to claim 1, wherein the SS/PBCH block measurement is deemed to be relevant if it exceeds a certain threshold that is provided in the at least one reporting configuration, or if it is offset lower or higher than a reference SS/PBCH block measurement where the offset is provided in the at least one reporting configuration.

7. The apparatus according to claim 6, wherein the reference SS/PBCH block measurement corresponds to strongest SS/PBCH block measurement in a cell.

8. A method, comprising:
  receiving, at a user equipment, at least one reporting configuration from a network, wherein the reporting configuration is based on at least one of channel state information reference signals, CSI-RS, resource, or synchronization signal/physical broadcast channel, SS/PBCH, blocks, and wherein the reporting configuration includes information about an association between the at least one CSI-RS resource and the at least one SS/PBCH block;
  determining whether an SS/PBCH block is associated with at least one configured CSI-RS resource;
  in response to the determination that the SS/PBCH block is associated with at least one configured CSI-RS resource, determining whether the associated CSI-RS resource is sufficiently detected;
  and
  in response to the determination that the SS/PBCH block is not associated with at least one configured CSI-RS resource, or the determination that the associated CSI-RS resource is not sufficiently detected, transmitting at least one measurement report that is based on the SS/PBCH block measurement when and as specified by the at least one reporting configuration, wherein a CSI-RS resource is sufficiently detected if its measurement is above a certain threshold provided in the at least one reporting configuration.

9. The method according to claim 8, wherein the receiving further comprises receiving a single reporting configuration for both the CSI-RS resource and the SS/PBCH blocks.

10. The method according to claim 8, wherein the transmitting further comprises transmitting the at least one measurement report while a reporting condition of a measurement event still holds, and wherein the at least one measurement report comprises at least one relevant SS/PBCH block that was not reported to the network node in previous Y measurement reports or X milliseconds since the last measurement report was sent.

11. The method according to claim 8, wherein the at least one reporting configuration contains a flag instructing the user equipment to carry out cell and beam measurements using CSI-RS and SS/PBCH and to follow a same reporting criterion and reporting format for both reference signal types.

12. The method according to claim 8, wherein the at least one measurement report that is based on SS/PBCH block measurements contain N strongest SS/PBCH blocks above a predefined threshold.

* * * * *